April 18, 1950     J. L. HIGHT     2,504,125
PARACHUTE RELEASE MECHANISM
Filed Jan. 2, 1947     2 Sheets-Sheet 1
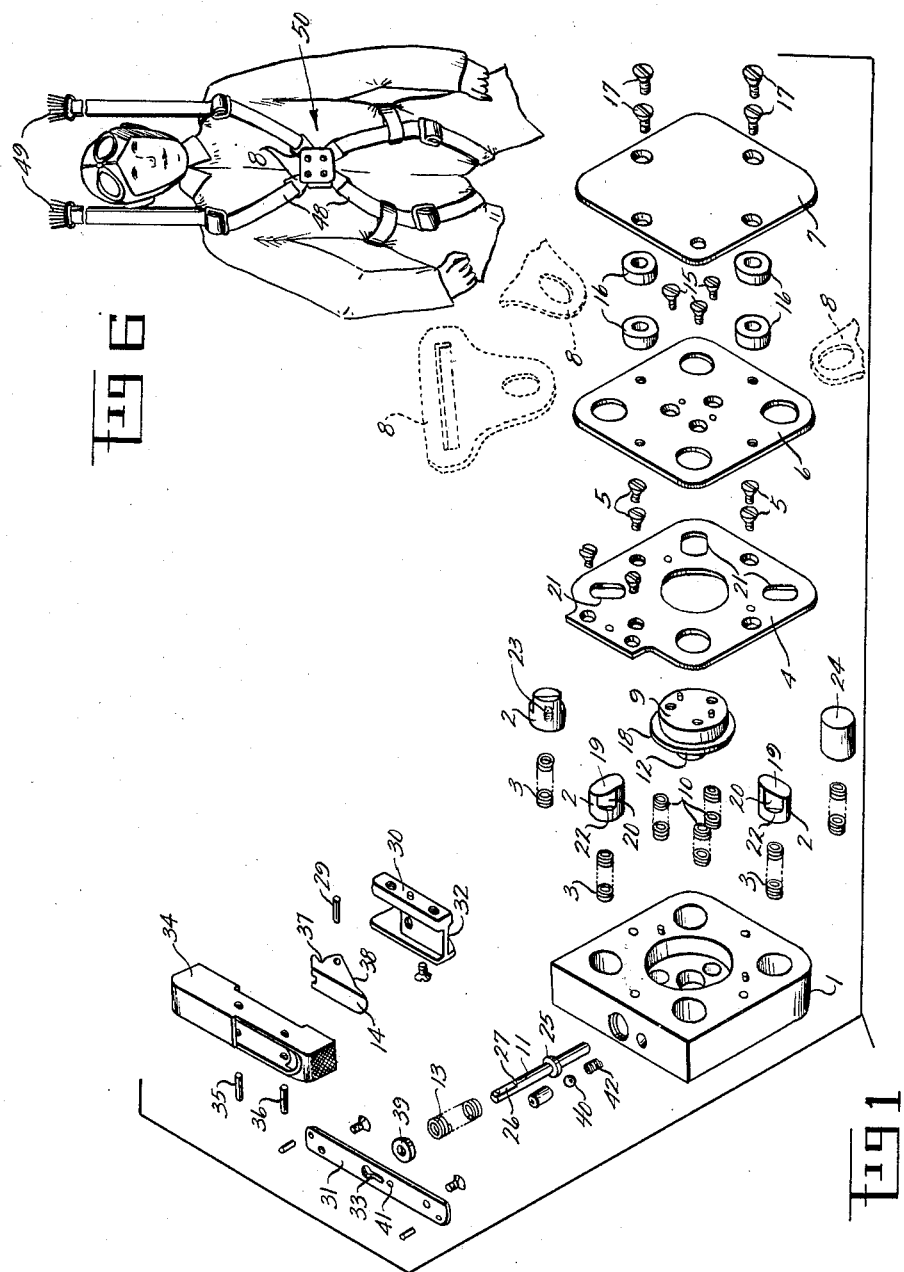
INVENTOR.
JAMES L. HIGHT
BY
Wade Koontz
HIS ATTORNEY April 18, 1950     J. L. HIGHT     2,504,125
PARACHUTE RELEASE MECHANISM
Filed Jan. 2, 1947     2 Sheets-Sheet 2
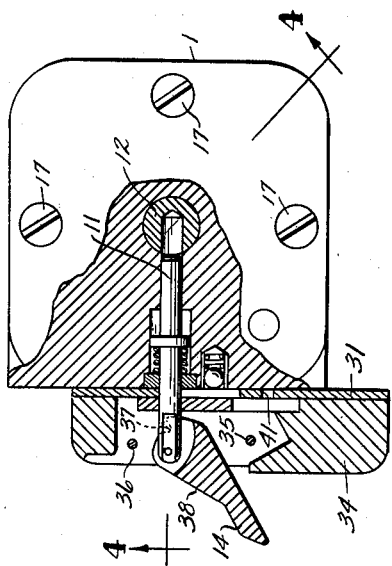
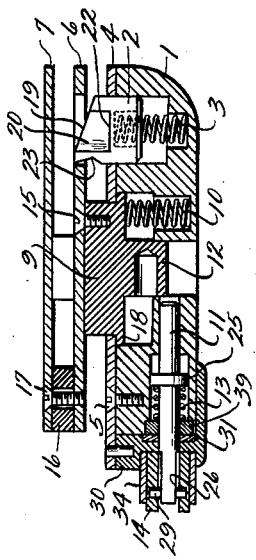
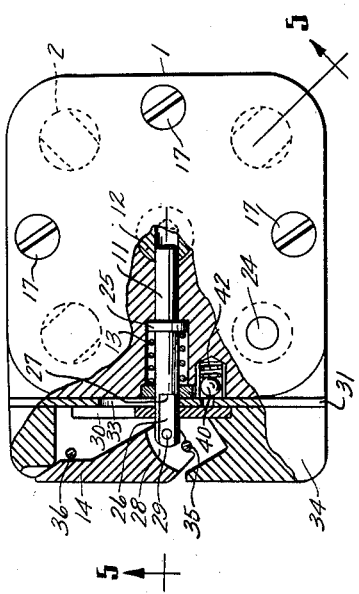
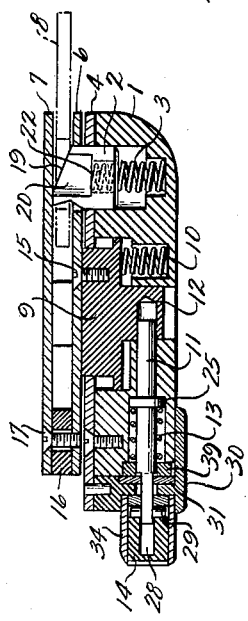
INVENTOR.
JAMES L. HIGHT
BY
Wade Koontz
HIS ATTORNEY Patented Apr. 18, 1950

2,504,125

UNITED STATES PATENT OFFICE 2,504,125

PARACHUTE RELEASE MECHANISM

James L. Hight, Boulder, Colo.

Application January 2, 1947, Serial No. 719,643

15 Claims. (Cl. 294—83)

(Granted under the act of March 3, 1883, as amended April 30, 1928; 370 O. G. 757)

The invention described herein may be manufactured and used by or for the government for governmental purposes without the payment to me of any royalty thereon.

My invention relates to a parachute release mechanism having the purpose of freeing a parachutist from a parachute and its attendant harness. It particularly relates to a new and useful mechanism which effects an automatic, safe, and rapid release from the parachute and its attendant harness at the instant when the user contacts the ground, the sea, or any other similar object upon which he might descend.

For the purpose of personal safety, it is always desirable for the parachutist to be able to free himself rapidly from the parachute and the harness at the earliest possible moment after landing, inasmuch as the dragging effect of the parachute may injure him, or, in the case of a water landing, the encumbrance of the parachute might even result in drowning if the parachutist is unable to free himself immediately. Moreover, it is highly desirable that his hands be free as much of the time as possible in order to permit him to perform emergency operations such as the operation of life rafts, flares, and similar apparatus. In the case of military paratroopers endeavoring to land in hostile territory, rapid release is still more desirable, inasmuch as the paratrooper must be prepared at the earliest possible moment to engage the enemy or to seek cover from attack. Moreover, his hands must be free as much of the time as possible during the descent in order to permit the manipulation of firearms or other defensive or offensive equipment without delay or interruption.

I have found that release mechanisms hitherto used have not been entirely satisfactory, in that they require direct manual operation at or after the moment of landing, consequently requiring the employment of the hands, which might otherwise be used for other purposes. The disadvantage to the user is thus twofold; he may be deprived of the use of auxiliary or emergency apparatus while operating the release mechanism; and he may be unable to free himself at all if for any reason his hands are incapacitated, as by previous injury or because they are entangled in auxiliary apparatus. In contrast, my invention obviates these difficulties by providing for an automatic release of the parachute and its attendant harness at the moment of landing, without the employment of the paratrooper's hands. The automatic release is effected in response to the relaxation of tension in the parachute risers which occurs when the parachutist contacts the ground and thereby relieves the parachute risers of their load.

Accordingly, it is an object of my invention to provide a simple and effective mechanism designed to permit the rapid and automatic release of the parachute and the harness from the user at the moment of landing or at any other time when he chooses to jettison his parachute under emergency conditions.

In addition to the advantage obtained by the automatic operation as aforesaid, my invention has certain other advantages over the devices hitherto used for the same purpose.

For example, because of the simple construction which I have devised, the mechanism will operate properly regardless of whether or not it is fouled with mud, dirt, or other similar impediments which are likely to encumber the mechanism in actual use under field conditions.

Another object of my invention resides in the provision of a device in which the D-rings of the parachute are anchored on teeth which are springs urged out of engagement with the D-rings. Consequently, when the tension on the D-rings is relaxed, the teeth will be disengaged therefrom, and the parachute will be released from its load. A safety device is provided for positively locking the teeth in engagement with the D-rings until such time as it is found desirable to release them to the action of the spring-urged disengaging means.

A still further advantage resides in the fact that because of the simplicity of my construction it is singularly adapted to mass production on a rapid and economical basis.

My invention will be readily understood by reference to the accompanying drawings and the following specification, which in conjunction describe one embodiment of the invention. It will be understood, of course, that other embodiments falling within the scope of the appended claims will occur to those skilled in the art to which it appertains.

In the drawings, Fig. 1 represents an exploded view of the entire release mechanism; Figs. 2 and 4 represent sectional views of the mechanism in unlocked position; while Figs. 3 and 5 represent similar views of the mechanism in its locked position. Fig. 6 is a view showing one way in which my release mechanism may be used to attach a parachute to a human load.

By reference to the drawings, it will be noted that the invention comprises generally a base member 1 containing spring-actuated retractible teeth 2, which are biased by springs 3 to protrude in their normally extended position through a lock plate 4 fixedly secured to base member 1 by screws 5. When the mechanism is in locked position (Figs. 3 and 5) hereinafter described, the teeth 2 also protrude through a release plate 6 and, under pressure from springs 3, into firm contact with a retaining plate 7, which is fixedly spaced from the release plate 6. When the release mechanism is in the locked position, the teeth 2 thus serve to retain D-rings 8 in a locked position (as shown in Figs. 3 and 5) between the release plate 6 and the retaining plate 7. The D-rings 8 are attached directly to the parachute risers; i. e., the lines which normally connect the parachute umbrella portion to the load to be dropped. Alternatively, the D-rings may be fastened to the straps forming the harness which normally retains the parachute assembly to the load, which may be either a man or some dead weight object.

The fixed structure formed by the release plate 6 and the retaining plate 7 is arranged to move in reciprocating fashion between locked and unlocked position by means of the plunger 9, which is biased toward the outward or unlocked position away from base 1 by springs 10 (Fig. 1). When the plunger 9 is retracted to the locked position by manual pressure on retaining plate 7, against the pressure of springs 10, the structure comprising the release plate 6 and the retaining plate 7 is drawn into contact with the base member 1, with the result that the teeth 2 pass directly through the release plate 6 into firm contact with the retaining plate 7, as aforesaid, so that they may bar any movement of the D-rings 8 which might tend to free the parachute harness from the release mechanism. In the extended or unlocked position of the release mechanism, the structure comprising the release plate 6 and the retaining plate 7 is pushed by the plunger 9 away from the base member 1 by action of springs 10, so that the teeth 2 are withdrawn from the space between the release plate 6 and the retaining plate 7, thereby freeing the D-rings 8 so that they and the parachute risers or harness may fall free of the release mechanism and the wearer.

For the purpose of locking the release mechanism in its locked position—i. e., in the position in which the release plate 6 and its attendant structure are held in close contact with the base 1—there is provided a locking structure comprising lock bar 11, which is passed through a side hole of the block 1 and is arranged for reciprocating motion into engaging or disengaging relationship with a locking lug 12 on the lower end of the plunger 9. In the locked position of the mechanism, the lock bar 11 will engage with a hole in the lug 12 in such a manner as to secure the plunger 9 and thereby the structure of the release plate 6 and the retaining plate 7 in the inward or locked position against the outward pressure of the compressed springs 10. The lock bar 11 is normally forced to the inward or locking position by the action of the spring 13. Release of the mechanism to the unlocked position is effected by a withdrawal of the lock bar 11 by means of the lever 14, which, when manually operated, withdraws the lock bar 11 from locking lug 12 on the end of plunger 9, thereby permitting the springs 10 to force the plunger 9, the retaining plate 7, and the release plate 6 away from the block 1 to disengage the D-rings from the teeth 2 in the manner aforesaid.

In greater detail, the construction of the mechanism is as follows. The plunger 9 is rigidly secured to the release plate 6 by means of the screws 15. The release plate 6 and the retaining plate 7 are secured together in fixed spaced relationship by means of cylindrical spacing members 16 and screws 17 extending through retaining plate 7 and spacing members 16 into threaded engagement with release plate 6. An annular flange 18 on plunger 9 is provided to engage lock plate 4 in the unlocked position, thereby limiting the outward movement of the structure comprising plunger 9, release plate 6, and retaining plate 7.

It will be noted that the teeth 2 have, on their outward ends, inclined surfaces 19, which are designed to serve as means for readily inserting the D-rings between the release plate 6 and the retaining plate 7 by the simple expedient of pressing the D-rings against these surfaces 19 with sufficient force to permit the teeth 2 to retract against the spring action of the springs 3 and permit the D-rings to pass inwardly. After such inward passage, the teeth return under the pressure of the springs 3 into firm contact with the release plate 7, thereby securely locking the D-rings in position. The lower end of each tooth is drilled out to allow the insertion of the springs 3, which bias the teeth to the outward position and hold them in firm contact with the release plate 7. It will also be noted that on either side of the teeth is a flattened surface 20, which cooperates with a corresponding flattened surface 21 in the openings in the lock plate 4. The interaction of these flattened surfaces 20 and 21 prevents the teeth from rotating to a position in which the inclined surfaces 19 are faced inwardly, with the result that the D-rings would be improperly released by the pressure which they would then exert on the surfaces 19. There is also provided a shoulder portion 22 on the sides of the teeth 2 to serve as a stop for the teeth when such shoulder portion engages the lock plate 4. This is for the purpose of limiting the outward movement of the teeth 2 so that they will not follow the release plate 6 when the latter is moved away from the teeth 2 by the plunger 9 in the unlocking movement.

On the inner side of the teeth, there may also be provided a concave or serrated surface 23, which may be desirable in order to increase the friction between the D-rings 8 and the teeth 2. As explained hereinafter, a frictional force at that point is necessary to insure the desired automatic action. I have found the friction provided by a flat tooth surface to be sufficient, but I have suggested the concave or serrated surface 23 to increase the same as a safety factor where necessary.

The member 24 constitutes a cylindrical dummy tooth which is spring-biased into engagement with retaining plate 7. Except for the special surfaces and shoulders, it is the same as teeth 2 in construction and serves as an aid to maintain the alignment of the various parts. It can, of course, be replaced by another tooth 2 if desired.

In greater detail, the locking structure is as follows. The locking bar 11 is provided with an annular flange 25 and a flattened end portion 26 terminating at shoulder 27. The lever 14 is provided with a suitable central channel 28, into which the flattened end portion 26 is inserted and pivotally secured by means of pin 29, which passes through suitable holes in both the lever 14 and the flattened end portion 26. The compression spring 13 exerts reaction forces on both annular flange 25 and a collar 39 to bias the locking bar 11 to its inward or locking position. The lever 14 may be mounted upon the base 1 in any suitable manner, such as by the block 30, which is rigidly secured to the base 1 by suitable bolts or screws.

As an added precaution, an auxiliary safety lock is provided to preclude accidental operation of the lock lever 14, such as by inadvertent striking of the lever by the hands or arms of the parachutist during descent. The auxiliary safety lock takes the form of a slide 31 positioned adjacent to the base 1 and adapted to slide between the base 1 and the block 30 in a groove 32 cut into the latter. The slide is provided with a keyhole 33, through which the locking bar 11 passes and which is designed to engage in locking position the shoulder 27 of the lock bar 11. As will be noted from the drawing, the narrow end of the keyhole will engage the shoulder 27 and prevent outward passage of the lock bar 11, thereby prohibiting unlocking. When the slide is pushed to the other end manually, the larger end of the keyhole is brought into juxtaposition with the shoulder 27, and, since the larger end of the keyhole is larger than shoulder 27, the latter may freely pass through it, permitting unlocking of the lock bar 11 whenever the operator so desires by operation of the lever 14. Slide 31 forms the lower side of a sliding cover 34 for the lever 14. Slide 31 is operated by manual pressure on cover 34. Cover 34 is provided with two transverse pins 35 and 36 designed to cooperate, respectively, with a locking slot 37 and a cam surface 38 on the lever 14. When slide 31 and cover 34 are in the locked position, the pin 35 will engage slot 37 and prevent any rotation of the lever 14. As the cover 34 and the slide 31 are moved toward the unlocked position, the pin 35 will disengage slot 37, whereupon the pin 36 will exert pressure upon cam surface 38 to rotate lever 14 into a position where it may readily be grasped by the operator for further manipulation to unlock the locking bar 11. To hold the slide 31 more firmly in its locked position, a spring-biased ball 40 may be provided to exert pressure against a hole 41 in slide 31. Spring 42 will press the ball 40 against the hole 41 with sufficient force to prevent undesirable movement of the slide, as by gravity. The ball 40 will, of course, be caused to retract when manual pressure is exerted on cover 34 during the unlocking movement.

In Figure 6 is shown one method of applying my release mechanism, indicated generally at 50, to a conventional type of parachute harness. As shown here, the D-rings 8 are attached to harness straps 48, which are joined in a well-known manner to the parachute risers 49.

The operation of the entire mechanism follows. When the operator in his descent reaches a point, preferably not far from the ground, from which he can foresee a safe landing, he will prepare the mechanism for automatic operation so that it will effect a release at the actual moment of contact with the ground. To do so, he will remove the safety lock action by pushing the lever 14 downward, thereby withdrawing the lock bar 11 from contact with the locking lug 12 on the plunger 9, the auxiliary safety lock slide 31 having previously been pushed to its unlocking position by manual pressure on cover 34. At this point, the plunger 9, together with the structure of the release plate 6 and the retaining plate 7, will not move outward to release the D-rings 8 from the teeth 2, because the tension of the parachute risers acting on the D-rings will create sufficient frictional force between the D-rings and the inner sides of the teeth 2 to overcome the tendency of the compressed springs 10 to push the D-rings away from contact with the teeth 2. The mechanism, therefore, remains in a closed position, with the D-rings rigidly held in the mechanism. Upon contact of the operator with the ground, the tension of the parachute risers is automatically removed, since the risers are relieved of their load. The frictional forces, therefore, disappear, and the springs 10 are thereupon freed to push the D-rings, the plunger 9 and its attendant mechanism, the release plate 6, and the retaining plate 7 outward away from the teeth. The D-rings are thereby automatically freed from the retaining action of the teeth and fall outward to permit the parachute risers and harness to fall away from the user. As already indicated, the frictional force may be increased, if desired, by the use of concave or serrated surfaces 23 on the inner sides of the teeth. Similarly, the surfaces of the D-rings may be serrated at their point of contact with the teeth 2.

If the operator should land in a tree or similar obstruction and find himself suspended in the air by the parachute risers, he may release himself by the simple expedient of releasing the locking lever and pulling downward on the risers with his hands, thereby relieving the tension in the risers and permitting the release mechanism to open automatically. He may, of course, release himself in the same manner at any other moment desired; for example, if he should desire to release himself during descent just before the actual moment of contact with the ground, he may do so by pulling downward on the risers. It will be understood, however, that he will be careful not to unfasten the locking lever at any moment when he is being tossed about in his parachute by atmospheric turbulence or like disturbances, inasmuch as such disturbances may momentarily relieve the tension in the risers and prematurely release the mechanism. Similarly, if he foresees a landing in a tree or like undesirable obstruction, he will be careful not to unfasten the locking lever until he has ceased all violent swaying motion and has had opportunity to determine that it will be safe to release himself and drop to the ground.

Although I have described my invention in considerable detail and have therefore utilized certain specific terms and language herein, it is to be understood that the present disclosure is illustrative rather than restrictive and that changes and modifications may be resorted to without departing from the spirit or scope of the claims appended hereto.

What I claim is:

1. A parachute quick-release device comprising a base, a part mounted for sliding movement on said base, a pair of spaced plates secured to said part, an element mounted on said base and extending into the space between said plates, means for resiliently urging said part to move outwardly from said base so as to carry said plates away from said element, and a strain member normally pressed into engagement with said element in the space between said plates so as to prevent said urging means for moving said part outwardly until the pressure on said strain member is relieved.

2. The invention recited in claim 1 including a selectively operable means for positively preventing said urging means from moving said part outwardly and so preventing premature operation of said device.

3. The invention recited in claim 1 including means for positively preventing said urging means from moving said part outwardly and so preventing premature operation of said device, said means including a first manipulable member adapted to lock or unlock said part, and a second manipulable member adapted to lock or unlock said first manipulable member.

4. A parachute quick-release device comprising a base, a plunger mounted for sliding movement within said base, a pair of spaced plates secured to said plunger, a plurality of apertured strain members located within the space between said plates, a retaining tooth extending through the aperture in each of said strain members, said teeth being mounted in said base and extending into the space between said plates, means for resiliently urging said plunger outwardly so as to carry said plates away from said teeth, and means normally tending to press said strain members against said teeth so as to frictionally restrain said urging means from moving said plunger outwardly until said pressure is relieved, whereupon said plunger and plates will be moved outwardly and said strain members will be released from said teeth.

5. An automatic parachute release mechanism comprising a body member, a plurality of parachute engaging pins projecting from said member, a recessed parachute cleaning device having apertures for receiving said pins and mounted on said body member for movement from a parachute engaging position to a parachute releasing position, said pins being of such a length as to extend into the recess in said device when the latter is in its parachute engaging position and to be withdrawn therefrom when the device is in its parachute releasing position, and means for moving said device from its engaging position to its releasing position when the pull on the parachute from the load is relaxed whereupon said pins will be withdrawn from said recess and the parachute cleaned from said release mechanism.

6. The invention recited in claim 5 including means for locking said device in its parachute engaging position, and manipulative means for removing said locking means.

7. The invention recited in claim 6 including a manually operable device for locking said manipulative means.

8. An apparatus for automatically releasing a parachute from its load comprising a plurality of strain members fixedly attached to the parachute, and a mechanism for releasably fastening said strain members to the load, said mechanism including a body member, a plurality of pins projecting from said member for engaging said strain members, a device for cleaning said strain members from said pins, said device having a recess for receiving said strain members and apertures for receiving said pins, means for mounting said device on said body member for movement from a parachute holding position to a parachute releasing position, said pins being of such a length as to extend into the recess and through the strain members when said device is in its holding position, and to be withdrawn from the recess and the strain members when said device is in its releasing position, and means operating in response to the removal of tension from said strain members for moving said device from its holding position to its releasing position whereupon said pins will be withdrawn from said strain members and the parachute released from its load.

9. The invention recited in claim 8 wherein said last-named means includes a spring.

10. The invention recited in claim 8 wherein said last-named means includes a spring, the operation of which is normally prevented by the frictional engagement between said pins and said strain members.

11. The invention recited in claim 8 including means for locking said device in its holding position, and manipulative means for removing said locking means.

12. The invention recited in claim 11 including a manually operable device for locking said manipulative means.

13. The invention recited in claim 8 wherein said last-named means includes a spring, the operation of which is normally prevented by the frictional engagement between said pins and said strain members, and including means for locking said device in its holding position, and manipulative means for removing said locking means.

14. The invention recited in claim 13 including a manually operable device for locking said manipulative means.

15. The invention recited in claim 8 wherein said pins are slidably mounted in said body member, and including means for resiliently urging said pins outward from said body member, means for limiting the outward travel of said pins under the influence of said urging means, and an inclined camming surface formed on the outer end of each of said pins for enabling said strain members to be engaged with said pins when said device is in its holding position, said strain members acting on said camming surfaces to force the pins inwardly against the influence of said urging means.

JAMES L. HIGHT.

REFERENCES CITED

The following references are of record in the file of this patent:

UNITED STATES PATENTS

| Number | Name | Date |
|---|---|---|
| 2,435,649 | Gray | Feb. 10, 1948 |